United States Patent Office 3,059,913
Patented Oct. 23, 1962

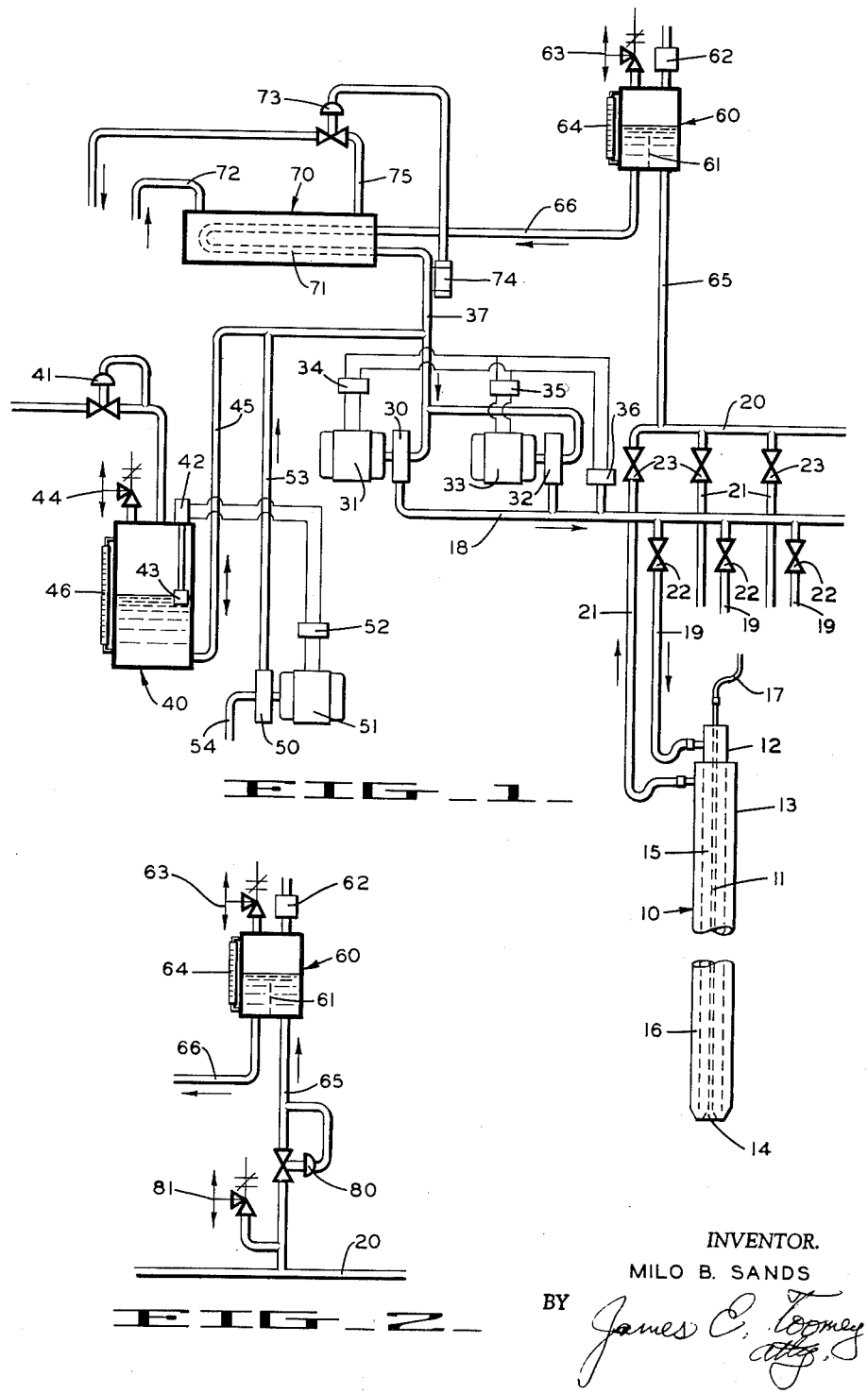
INVENTOR.
MILO B. SANDS

3,059,913
COOLING SYSTEMS FOR DEVICES USED IN METAL REFINING PROCESSES
Milo B. Sands, San Lorenzo, Calif., assignor to Henry J. Kaiser Company, Oakland, Calif., a corporation of Nevada
Filed Sept. 29, 1958, Ser. No. 764,121
9 Claims. (Cl. 266—34)

This application relates generally to systems for the introduction of materials, such as oxidizing agents, into the interiors of highly heated chambers or vessels, for example, metal refining furnaces, converters and the like. More particularly, the invention relates to an improved cooling system for devices used for the introduction of said materials into said highly heated vessels.

In metal refining processes, such as the refining of pig iron, glister copper, etc., a molten metal charge is reacted with an oxidizing material, which may be solid, liquid, vaporous or gaseous in nature, in order to remove the impurities in the metal. For example, in the pneumatic process commonly referred to as the "Bessemer process" for refining pig iron, air is blown upwardly by means of bottom tuyeres through a molten charge of iron and impurities contained in a pear-shaped converter and in the open hearth process of refining pig iron the metal charge is reacted with iron ore in order to oxidize impurities. In recent years, oxygen or oxygen-enriched air has been reacted with the molten pig iron charge by means of a lance which is introduced into the highly heated interior of the furnace or converter. For example, lances are presently used in the open hearth steel refining process for decreasing the time of refining and in the steel refining processes wherein oxygen or oxygen-enriched air is used as the primary refining means to develop the heat necessary for refining by oxidation of the impurities in the molten metal. During the refining operation in the latter mentioned processes the nozzle of the lance may be either submerged below the molten metal surface or be located above the said surface, and the converter or vessel may, if desired, be rotated about its central axis during the refining operation. One example of such a process is the L-D process wherein the molten metal surface is blown with oxygen as set forth in Patent No. 2,800,631.

The lances employed in metal refining operations are subjected to extremely high temperatures which deleteriously affects the life and service thereof. For example, in the L-D process the lance for introducing oxygen or oxygen-enriched air into the interior of the converter is subjected to temperatures on the order of 2500 to 3000° F. To withstand these temperatures, the lance is subjected to cooling by a liquid medium, usually water. However, the cooling systems used heretofore have not been entirely satisfactory and have not adequately protected the lances from the abuse of these high temperatures. The prior cooling systems have not adequately and uniformly cooled the lance components, particularly the outside wall which is subjected to the greatest heat influx, with the attendant result that the different thermal expansions of the components will cause leakage which not only shortens the life of the lance but also has a detrimental effect on the steel refining process. Also, leakage of the cooling liquid into the high temperature zone of the vessel may cause an explosion hazard.

Therefore, it is a primary object of this invention to provide a pressurized closed circuit cooling system for devices used for the introduction of materials into highly heated chambers or vessels, which system will overcome or substantially reduce the disadvantages of prior art systems.

It is also an object of this invention to provide a pressurized closed circuit cooling system for a lance used in metal refining operations, which cooling system will uniformly cool the components of the lance, thereby eliminating or substantially eliminating damage to the lance as well as to the metal refining operation.

It is a further object of this invention to provide a pressurized closed circuit cooling system for a lance used in metal refining operations wherein said cooling system will prevent boiling of the cooling medium in said lance when said lance is exposed to high temperature metal refining operations.

It is an additional object of this invention to provide a pressurized closed circuit cooling system for a lance for high temperature metal refining operations wherein the fluid pressure of the cooling medium supplied to the lance is above the vapor pressure at the temperature of the cooling medium in the lance.

These and further objects and advantages of the invention will be apparent from the following more detailed description of the invention. The invention is specifically described in conjunction with an open-mouth converter utilized in the refining of molten ferrous metal by the L-D process. This constitutes one advantageous application of the invention; however, it is to be understood that the invention is not limited thereto, since it is fully applicable to all refining operations which employ a converter or vessel wherein one or more lances for supplying oxidizing agents, e.g. oxygen or oxygen-enriched air, project into the highly heated interior of the converter or vessel.

Broadly, the cooling system is a pressurized closed circuit system and comprises in combination with a device for introducing materials into the interior of a highly heated chamber, passage means for circulating cooling medium through a device, such as an oxygen lance, means for circulating said cooling medium in said system, means for maintaining said cooling medium to said device under a pressure sufficient to prevent boiling of said medium while in said device, means for reducing the pressure of said medium after it has passed through said device, and means for extracting heat from said medium while at said reduced pressure. Also included in the system are means for removing vapor from said medium while at the reduced pressure, means for maintaining the system substantially completely filled with cooling medium, means for adding cooling medium to the system to compensate for leakage and vapor loss, safety means for relieving excessive pressure of said cooling medium and temperature control means for adjusting and controlling said means for extracting heat from said cooling medium.

The pressurized closed circuit cooling system of the invention is self-compensating for varying thermal conditions and automatically adjusts for changes in the volume of cooling medium which are due to thermal expansion or contraction of the cooling medium and of the components of the system and for leakage and vapor losses.

The invention is further described with reference to the accompanying drawings wherein:
FIGURE 1 is a diagrammatic illustration of one cooling system embodying the principles of the invention.
FIGURE 2 is a partial diagram of a cooling system showing an alternate means for reducing the pressure of the cooling medium.

Referring to FIGURE 1, there is shown a system for cooling lances for metal refining processes, such as the L-D process. In FIGURE 1 an oxygen lance 10 is shown comprising an inner centrally located tubular member 11 and concentrically disposed outer enclosing members 12 and 13 of annular horizontal transverse section. The tubular member 11 has at its lower extremity a nozzle 14 for emitting oxygen onto the surface of the molten metal bath. The concentrically disposed members 12 and 13 form, with member 11, annular passages 15 and 16 for the flow of cooling medium, such as water, in order to prevent the lance components from being overheated when exposed to the highly heated interior of the oxygen steel converter.

At its upper extremity tubular member or oxygen pipe 11 is connected to a flexible hose member 17 which in turn is connected to a source of oxygen supply (not shown).

Annular passage 15, which is formed by tubular member 11 and tubular member 12, and annular passage 16, which is formed by enclosing members 12 and 13, form connected annular paths for the cooling medium. The cooling medium entering passage 15 flows in a downward direction to the bottom of enclosing member 12 which is near the lower extremity of the lance 10. The cooling medium then reverses flow and travels upwardly in the annular passage 16 and is discharged from the lance 10.

The cooling medium or coolant enters the passage 15 of lance 10 by means of a flexible hose 19 which is connected to a supply conduit or tube 18. The coolant leaving lance 10, after flowing through passages 15 and 16 enters flexible hose 21 which is connected to conduit or tube 20. The water then is recirculated in the system and returned for passage through the lance 10 as will be hereinafter described. Valve 22, in hose 19, and valve 23, in hose 21, are for starting and stopping the flow of cooling medium when desired. Valves 22 and 23 may be either manually controlled or remotely operated.

In FIGURE 1, there are shown several flexible hoses 19 and 21 which may be connected to additional lances (not shown). For the purpose of simplicity the description will be confined to one lance.

The cooling medium is circulated in the system by means of a suitable pumping mechanism such as centrifugal pumps 30 and 32 which are powered by motors 31 and 33, respectively. In normal operation one pump is operated while the other pump is in a standby condition. When so operated, if the pressure drops in supply conduit 18, pressure switch 36 will start the standby pump by means of either starter switch 34 or starter switch 35 depending upon which pump is in standby condition. Water is supplied to the pumping mechanism by conduit or tube 37 in the closed circuit.

A compression tank 40 is connected to conduit 37 by conduit or tube 45 and "floats" on the suction side of the circulating pumping mechanism. Tank 40 is partially filled with coolant and the top of the tank chamber is supplied with compressed air or inert gas at a constant pressure by means of pressure reducing valve 41. The purpose of compression tank 40 is to maintain a completely or substantially completely coolant-filled system at substantially constant pressure. An example of pressures in operation the coolant pressure supplied to the lance 10 will be from 110 to 130 p.s.i.g., while the outlet pressure of the water at the flash tank 60, hereafter described, will be on the order of 65 to 70 p.s.i.g.

A suitable level control mechanism 42 responds to the level of the coolant in tank 40 by means of a float 43. Relief valve 44 is mounted on top of tank 40 as a safety device and allows the air or gas to escape from tank 40 in the event of excessive pressure in the system. A gage glass 46 is mounted on the side of tank 40 and indicates the level of the coolant.

In the event that the coolant level recedes in compression tank 40, level control 42 will actuate a pump 50 by means of starter switch 52 and motor 51. Pump 50 which is connected to conduit or tube 54 which in turn is connected to an outside source of coolant (not shown), will inject coolant into the system through conduit or tube 53.

Small volume changes due to thermal expansion or contraction of the coolant and/or the components of the system will be corrected by flow into or out of the compression tank 40. This correction by tank 40 permits the operation of the system with the minimum addition of coolant required. Also, the compression tank in conjunction with injection pump 50 will prevent film surface boiling of the coolant along the outside enclosing member 13 of lance 10. Film temperatures of the coolant along enclosing member 13 will be higher than the temperature of the mass of coolant present in lance 10 and will be at a maximum at the point of greatest heat influx. Surface boiling will occur when ever the vapor pressure exceeds the fluid pressure. The compression tank 40 and pump 50 will maintain the system above the film vapor pressure at the temperature of the coolant in the lance. Prevention of film surface boiling will permit full liquid to solid contact between the coolant and outer enclosing member 13 thereby preventing local overheating of the lance 10 which is detrimental to the life thereof.

After the coolant has circulated through the lance 10 and passes through flexible hose 21 and conduit 20, it enters a flash tank 60 by way of conduit or line 65. As shown in FIGURE 1, flash tank 60 comprises a chamber having an inlet, which receives coolant from conduit 65, and an outlet, which passes the coolant into a conduit or tube 66 after the coolant has passed through tank 60. The inlet and outlet are located at or near the botom or tank 60. A partition 61 is located in the interior of tank 60 and separates the inlet and the outlet. Partition 61 extends up the tank for a suitable distance, for example, approximately one half way up the tank. The flash tank is located at the highest elevation in the system and is of considerably larger cross-sectional size than line 65, thereby allowing the fluid pressure and velocity of the coolant to drop. Air and vapor will be removed from tank 60 by automatic vent valve 62. Valve 62, however, will not permit coolant to be lost. A safety valve 63 will allow stem to escape in the event rapid boiling of the coolant takes place in the tank 60. A gage glass 64 mounted on the side of tank 60 will indicate the level of the coolant in tank 60.

The coolant leaving tank 60 by means of conduit 66 enters a suitable heat exchanging device, such as a shell and tube type exchanger 70. The coolant passes through coils 71 of heat exchanger 70 and cooling water or other coolant is circulated around the coils 71 thereby extracting heat from the coolant passing through the coils 71. In FIGURE 1, the cooling water enters heat exchanger 70 by means of conduit or tube 72, which is connected to an external supply of water or other coolant, is circulated around coils 71, and is then removed from the heat exchanger by way of conduit or tube 75.

A temperature control valve 73 is connected to conduit 75 and controls the cooling water or other coolant in heat exchanger 70. A suitable temperature sensing device, such as temperature bulb 74, is connected to conduit 37, which is the line through which the coolant passes from the heat exchanger to the pumping mechanism. Valve 73 responds to the bulb 74 and accordingly controls the flow of the cooling water in heat exchanger 70.

FIGURE 2 is a partial diagram of the system showing an alternate means for reducing the fluid pressure of the cooling medium after it leaves the lance 10. FIGURE 2 shows a pressure reducing valve 80 mounted in conduit 65. As valve 80 will reduce the pressure and velocity of the coolant, flash tank 60 need not be positioned at an elevation higher than the rest of the components of the system. In the means depicted in FIGURE 2, a relief valve 81 is located in conduit 65 as a safety feature in the event of malfunctioning of valve 80.

The flash tank 60, when placed either in the elevated position shown in FIGURE 1 or in the position shown in FIGURE 2, will act as an emergency cooling element in the event that the external cooling water supplied to heat exchanger 70 fails. As the coolant velocity and fluid pressure are lower in flash tank 60 than elsewhere in the system, mass boiling will start in the flash tank during such an emergency. The latent heat carried away by the steam escaping through safety valve 63 will reduce the heat content of the coolant to the extent that the lance 10 can be cooled for short periods of time under these abnormal conditions. This will prevent damage from occurring to the lance 10.

A further advantage of the closed cooling system above described is that the coolant when once heated is relieved of gases, such as dissolved oxygen, which are eliminated in flash tank 60. The coolant, such as water, thus de-aerated has little or no corrosive effects on the metal of the components of the system. Also, in this closed system, mineral deposits will be at a minimum.

As a specific illustration of a typical operation of the pressurized cooling system of the instant invention, the system is being employed with good success in cooling lances utilized in the L-D process. In a specific installation, the cooling system is designed to cool two oxygen lances operating simultaneously in separate steel converters. The cooling water is circulated by running one of two centrifugal pumps with a capacity of pumping 160 gallons per minute of 125° F. water against a total dynamic head of 200 feet. The pumps are driven by 15 horsepower electric motors at 3600 r.p.m.

The minimum level of the water in the compression tank is maintained by float level and switch means which operates an injection pump with a capacity of 30 gallons per minute against a total dynamic head of 277 feet and driven by a 5 horsepower electric motor at 3600 r.p.m.

The compression tank has a total volume of approximately 100 gallons and the flash tank has a volume of approximately 20 gallons.

In the system, one operating and one stand-by heat exchangers are utilized with capacities to cool 160 gallons of water per minute from 229° F. to 124° F. In cooling 600 gallons per minute of industrial water enters the heat exchanger at 90° F. and leaves at 118° F. The heat exchangers are straight tube, internal floating head, removable tube bundle.

From the foregoing disclosure it will be apparent that the present invention provides a cooling system which effectively overcomes the disadvantage of presently used systems. It should be understood that the invention is not limited to the L-D process but is fully applicable to any refining operation wherein a device, such as a lance, is introduced into the highly heated interior of a vessel or chamber. It should be further understood that the present invention is not limited to the specific details described above and illustrated in the drawings. The invention may be carried out with various modifications. For example, the compression tank, although desirable in the preferred system, may be excluded from the system and a suitable relief valve mechanism used in its stead. The valve mechanism, although not able to compensate for small volume changes due to thermal expansion or contraction of the coolant and/or components of the system, would adequately function, in conjunction with the injection pump to maintain the necessary pressure of the coolant. This and various other modifications may be made within the spirit and scope of the appended claims.

What is claimed is:

1. A pressurized closed circuit cooling system comprising, in combination, a device for introducing materials into the interior of a highly heated chamber, said device being provided with passage means through which a cooling medium for said system is circulated, conduit means for conducting said cooling medium through said system, said passage means being operably connected to said conduit means, means operably connected to said conduit means for circulating said cooling medium through said conduit means and thereby through said system, means operably connected to said conduit means for maintaining the portion of said cooling medium in said device under a pressure sufficient to prevent boiling of said medium while in said device, means operably connected to said conduit means for reducing the pressure of said medium after it has passed through said device, means operably connected to said conduit means for removing gases and vapors from said medium while at the reduced pressure, means operably connected to said conduit means for extracting heat from said medium while at said reduced pressure and means comprising a portion of said conduit means for supplying the cooled medium from said heat extracting means to said circulating means for recirculation of said medium to said device.

2. The combination defined in claim 1 wherein said pressure maintaining means includes means for maintaining the system substantially completely filled with cooling medium, means for maintaining said cooling medium supplied to said device at substantially constant pressure and means for adding cooling medium to the system to compensate for leakage and vapor loss.

3. The combination defined in claim 2 wherein safety means connected to said means for reducing pressure are included for relieving excessive pressure of said cooling medium and to provide emergency cooling of said device, said combination also including temperature control means operably connected to said conduit means for adjusting and controlling said means for extracting heat from said cooling medium.

4. A pressurized closed circuit cooling system comprising, in combination, a device for introducing oxidizing agents into a metal refining furnace, said device being provided with a passage for introducing said oxidizing agents into the highly heated interior of said furnace, means surrounding said passage defining a path through which a cooling medium is circulated through said device, conduit means for conducting said cooling medium through said system, said path-defining means being operably connected to said conduit means, means operably connected to said conduit means for circulating said cooling medium through said conduit means and thereby through said system, means operably connected to said conduit means for maintaining the portion of said cooling medium in said device under a pressure sufficient to prevent boiling of said medium while in said device, means operably connected to said conduit means for reducing the pressure of said medium after it has passed through said device, means operably connected to said conduit means for removing gases and vapors from said medium while at reduced pressure, means operably connected to said conduit means for extracting heat from said medium while at said reduced pressure, and means comprising a portion of said conduit means for supplying the cooled medium from said heat-extracting means to said circulating means for recirculation of said medium to said device .

5. The combination defined in claim 4 wherein said pressure maintaining means includes means for maintaining the system substantially completely filled with cooling medium, means for maintaining said cooling medium supplied to said device at substantially constant pressure and means for adding cooling medium to the system to compensate for leakage and vapor loss.

6. The combination as defined in claim 5 wherein safety means connected to said means for reducing pressure are included for relieving excessive pressure of said cooling medium and to provide emergency cooling of said device, said combination also including temperature control means operably connected to said conduit means for adjusting and controlling said means for extracting heat from said cooling medium.

7. A pressurized closed circuit cooling system comprising, in combination,
- a lance for introducing oxygen into the highly heated interior of a steel converter,
- said lance being provided with a tubular member enclosing a passage for passage of said oxygen,
- outer enclosing members concentrically disposed around said tubular member and forming connected annular paths for circulation of cooling medium in said lance,
- conduit means for conducting said cooling medium through said system,
- said annular paths being operably connected to said conduit means,
- pump means operably connected to said conduit means for circulating said cooling medium through said conduit means and thereby through said system,
- a compression tank operably connected to said conduit means,
- a second pump means operably connected to said conduit means, in conjunction with said compression tank, for maintaining the portion of said cooling medium in said lance under a fluid pressure greater than the vapor pressure of said cooling medium in said lance,
- means operably connected to said conduit means for reducing the pressure of said medium after it has passed through said lance,
- means operably connected to said conduit means for removing gases and vapors from said medium while at the reduced pressure,
- means operably connected to said conduit means for extracting heat from said medium while at said reduced pressure and
- means comprising a portion of said conduit means for supplying the cooled medium from said heat-extracting means to said circulating means for recirculation of said medium to said device.

8. A pressurized closed circuit cooling system comprising, in combination,
- a lance for introducing oxygen into the highly heated interior of a steel converter,
- said lance provided with a tubular member enclosing a passage for passage of said oxygen,
- outer enclosing members concentrically disposed around said tubular member and forming connected annular paths for circulation of cooling medium in said lance,
- conduit means for conducting said cooling medium through said system,
- said annular paths being operably connected to said conduit means,
- pump means operably connected to said conduit means for circulating said cooling medium through said conduit means and thereby through said system,
- a compression tank operably connected to said conduit means,
- a second pump means operably connected to said conduit means, in conjunction with said compression tank, for maintaining the portion of said cooling medium in said lance under a fluid pressure greater than the vapor pressure of said cooling medium in said lance,
- a flash tank operably connected to said conduit means, located at the highest elevation in the system, for reducing the pressure of said medium after it has passed through said lance,
- said flash tank provided with means for removing gases and vapor from said medium while at said reduced pressure,
- means operably connected to said conduit means for extracting heat from said medium while at said reduced pressure, and
- means comprising a portion of said conduit means for supplying the cooled medium from said heat-extracting means to said circulating means for recirculation of said medium to said device.

9. A pressurized closed circuit cooling system comprising, in combination,
- a lance for introducing oxygen into the highly heated interior of a steel converter,
- said lance provided with a tubular member enclosing a passage for passage of said oxygen,
- outer enclosing members concentrically disposed around said tubular member and forming connected annular paths for circulation of cooling medium in said lance,
- conduit means for conducting said cooling medium through said system,
- said annular paths being operably connected to said conduit means,
- pump means operably connected to said conduit means for circulating said cooling medium through said conduit means and thereby through said system,
- a compression tank operably connected to said conduit means,
- a second pump means operably connected to said conduit means, in conjunction with said compression tank, for maintaining the portion of said cooling medium in said lance under a fluid pressure greater than the vapor pressure of said cooling medium in said lance,
- a pressure-reducing valve operably connected to said conduit means for reducing the pressure of said cooling medium after it has passed through said lance,
- a flash tank operably connected to said conduit means for removing gases and vapors from said medium while at said reduced pressure,
- means operably connected to said conduit means for extracting heat from said medium while at said reduced pressure,
- means comprising a portion of said conduit means for supplying the cooled medium from said heat-extracting means to said circulating means for recirculation of said medium to said device.

References Cited in the file of this patent

UNITED STATES PATENTS

| | | |
|---|---|---|
| 996,129 | Peck | June 27, 1911 |
| 1,640,629 | Van der Woude | Aug. 30, 1927 |
| 2,061,605 | Yoder | Nov. 24, 1936 |
| 2,254,917 | Schroder | Sept. 2, 1941 |
| 2,819,701 | Karassik | Jan. 14, 1958 |
| 2,829,960 | Vogt | Apr. 8, 1958 |
| 2,901,176 | Hoyt | Aug. 25, 1959 |
| 2,967,694 | Cunningham | Jan. 10, 1961 |